United States Patent [19]
Schneider et al.

[11] Patent Number: 5,307,610
[45] Date of Patent: May 3, 1994

[54] APPARATUS FOR THE MANUFACTURE OF A PACKAGE

[75] Inventors: Hans-Juergen Schneider, Bad Laasphe; Bruno Bretz; Klaus Meyer, both of Breidenbach-Wiesenbach, all of Fed. Rep. of Germany

[73] Assignee: Kraemer & Grebe GmbH & Co. KG Meschinenfabrik, Biedenkopf-Wallau, Fed. Rep. of Germany

[21] Appl. No.: 957,354

[22] Filed: Oct. 6, 1992

[30] Foreign Application Priority Data

Oct. 25, 1991 [DE] Fed. Rep. of Germany ....... 9113290

[51] Int. Cl.$^5$ .............. B65B 47/04; B65B 47/02; B65B 51/14
[52] U.S. Cl. .................................. 53/559; 53/370.7; 425/384; 425/398
[58] Field of Search ............ 53/453, 559, 370.7, 53/454, 456, 560, 561; 425/384, 398

[56] References Cited
U.S. PATENT DOCUMENTS

| | | | |
|---|---|---|---|
| 3,577,700 | 5/1971 | Bippus et al. | 53/559 X |
| 3,964,237 | 6/1976 | Johansen | 53/559 X |
| 4,048,781 | 9/1977 | Johansen | 53/453 |
| 4,565,052 | 1/1986 | Hautemont | 53/559 X |
| 4,987,725 | 1/1991 | Gill | 53/559 X |
| 5,014,500 | 5/1991 | Robache | 53/559 |
| 5,163,269 | 11/1992 | Williams | 53/453 X |

FOREIGN PATENT DOCUMENTS

| | | |
|---|---|---|
| 0403373 | 12/1990 | European Pat. Off. |
| 2437123 | 2/1976 | Fed. Rep. of Germany. |
| 3023143 | 1/1981 | Fed. Rep. of Germany. |
| 9111714.3 | 12/1991 | Fed. Rep. of Germany. |

Primary Examiner—Horace M. Culver
Attorney, Agent, or Firm—Flynn, Thiel, Boutell & Tanis

[57] ABSTRACT

In order to be able to produce packages economically and when the package design results in undercuts being provided in a deep-drawing tool for its manufacture, a simple and practical solution for the movement of the lower parts in each of the required work stations is advantageous. These lower parts are generally vertically movable in order to be able to easily open the mold. An inclined opening of the mold or rather removal of the lower part is achieved according to the invention in such a manner that between the lower part of the tool and the lifting device for facilitating its vertical movement there is provided a carriage guide which enables also an easy horizontal movement. A guide pin fastened on the carriage guide is part of a guide system which controls a desired forced inclined guided opening of the mold. The guide system can be used in deep-drawing tools, sealing tools and similar ones.

14 Claims, 5 Drawing Sheets

APPARATUS FOR THE MANUFACTURE OF A PACKAGE

FIELD OF THE INVENTION

An apparatus for the manufacture of a package, mainly within the framework of a packaging line, including a first foil supplied to a deep-draw receiving part for inserting the packaging material in a deep-drawing station and its closure in a sealing station with a preferably flat closure part formed of a second foil, which closure part forms the top side of the package, wherein a deep-drawing tool having a lower part which is movable vertically upwardly during deep-drawing and is moved vertically downwardly during an opening of the mold, and wherein in the lower part there is stationarily arranged a matrix.

BACKGROUND OF THE INVENTION

Particularly in the case of packages, the height of which exceeds their depth, base surfaces are needed in order to be able to sturdily stand up each package on the base surface. The base surface, including a protuberance thereon, can thereby be designed such that, even though the base surface extends approximately at a right angle with respect to the closing part, it is constructed so that the closing part, with the package standing erect, stands approximately vertically; this is the case when the point of the lowermost undercut and an other side spaced from the base surface are parallel and lie in planes which extend perpendicular relative to the plane of the closing part.

However, such a package of this type creates difficulties during its removal from the lower parts of the deep-drawing station and the sealing station, because they are moved only vertically downwardly when the respectively associated upper part is stationary. In the case of an undercut base surface on the package, which is hereby vertically oriented, the receiving part can therefore not be removed. A complicated system of lateral slide members is not possible in a high performance system.

The purpose of the invention is therefore to provide an apparatus of the type described in detail above in such a manner that, while keeping the advantages of an undercut base surface, such a package can be manufactured most importantly in a packaging line, so that the package can be easily removed. Each upper part is thereby to continue to be stationary.

SUMMARY OF THE INVENTION

The purpose is attained according to the invention in such a manner that a first side surface of the matrix is oriented perpendicularly with respect to the transporting direction and has an undercut, that a second side surface lying opposite said first side surface is inclined such that a release occurs between an upper die part and the matrix, which have the same contours, in the direction of the inclined second side surface, and that on the lower part of the deep-drawing tool or another tool, for example a sealing tool, there is provided a guide system which guides the lower part for movement parallel with respect to the inclined second side surface, which lower part with a stationary upper part of the same tool, including the associated upper die part, moves out downwardly during deep-drawing or rather after completion of the operation.

The lower part is thereby horizontally movable in the transporting direction of the package; this can be done in such a manner that the lower part is fastened to a carriage which is longitudinally movable in a carriage guide. The carriage guide in turn is rigidly fastened to a lifting device which itself is only vertically movable. In this manner it is sufficient when the lifting device can be driven by means of at least one driving mechanism in one single direction oriented perpendicularly with respect to the transporting direction of the package. With this it is possible to leave the drive of the lower part unchanged, regardless of whether or not the package has an undercut base surface. The carriage guide can of course be left out in the latter case, however, the lower part is then directly fastened to the lifting device.

It is advantageous when the lifting device consists of two lifting rails, on each of which a guide rail of the carriage guide is fastened, while on an other side on the underside of the lower part two slide rails forming the carriage are rigidly secured, which slide rails rest on the guide rails. For the purpose of facilitating the lateral guiding, it is particularly advantageous when the slide rails and the guide rails form a dovetail like connection. In this manner an easy movement of the lower part in the transporting direction of the package is assured. Guiding movement is further improved when roller bearings are arranged between the carriage and the carriage guide.

The lower parts are guided in a simple manner by providing a guide pin fastened to at least one sidewall of the lower part and is guided in an associated stationary guide track, for example, mounted on the machine frame and worked into a plate and forms together with said guide track the guide system. In order to avoid a canting of the carriage, it is of course possible to arrange a guide system on both sides of the sidewalls of the lower part.

BRIEF DESCRIPTION OF THE DRAWINGS

Further advantages and the greater details of the invention will be discussed in greater detail hereinafter in connection with the drawings and one exemplary embodiment. In the drawings.

DETAILED DESCRIPTION

Figure 1:
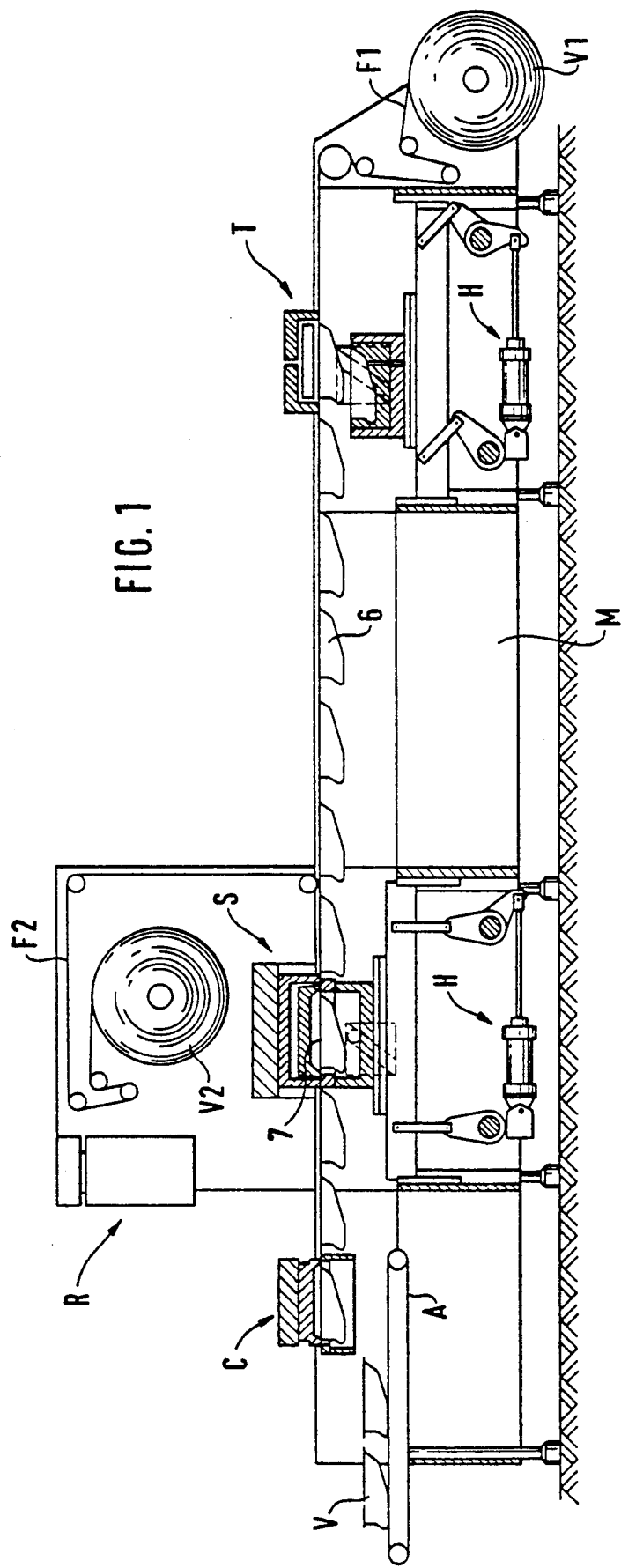
FIG. 1 shows a general side view of a packaging line.

A packaging line is schematically illustrated in FIG. 1 of the drawings, on which packaging line packages are created, for which the work stations according to the invention are suited. A storage roll V1 for a bottom foil F1 is provided on a machine frame M (at the right side of FIG. 1), which storage roll, for example by means of guide chains, is first moved into a deep-drawing station T where receiving parts 6 are formed into the bottom foil F1. An upper foil F2 is pulled off from a storage roll V2, from which upper foil closing parts 7 are formed in a sealing station S. The formed packages V are separated in a cutting station C. The finished packages finally reach a removal belt A. FIG. 1 shows further more that (pneumatically operable) lifting devices H are provided for removing the finished parts. A control mechanism R is used to control the packaging process.

Figure 2:
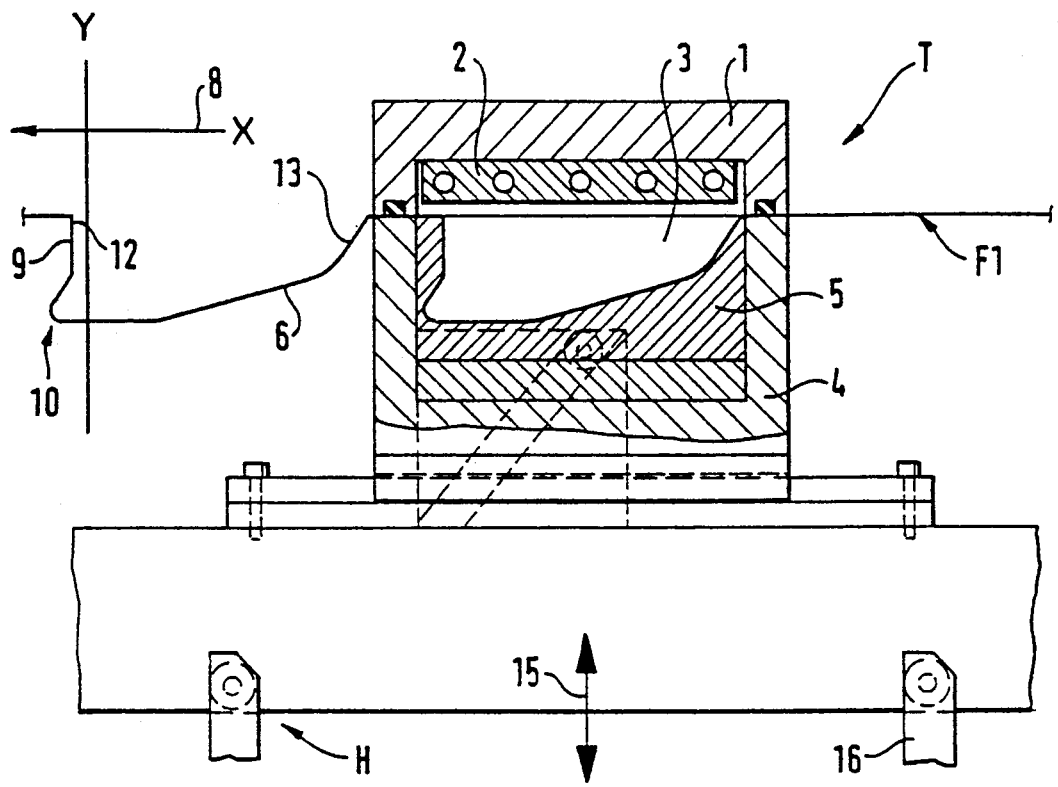
FIG. 2 is a partially cross-sectioned side view of a deep-drawing station T having a closed deep-drawing tool.
Figure 3:
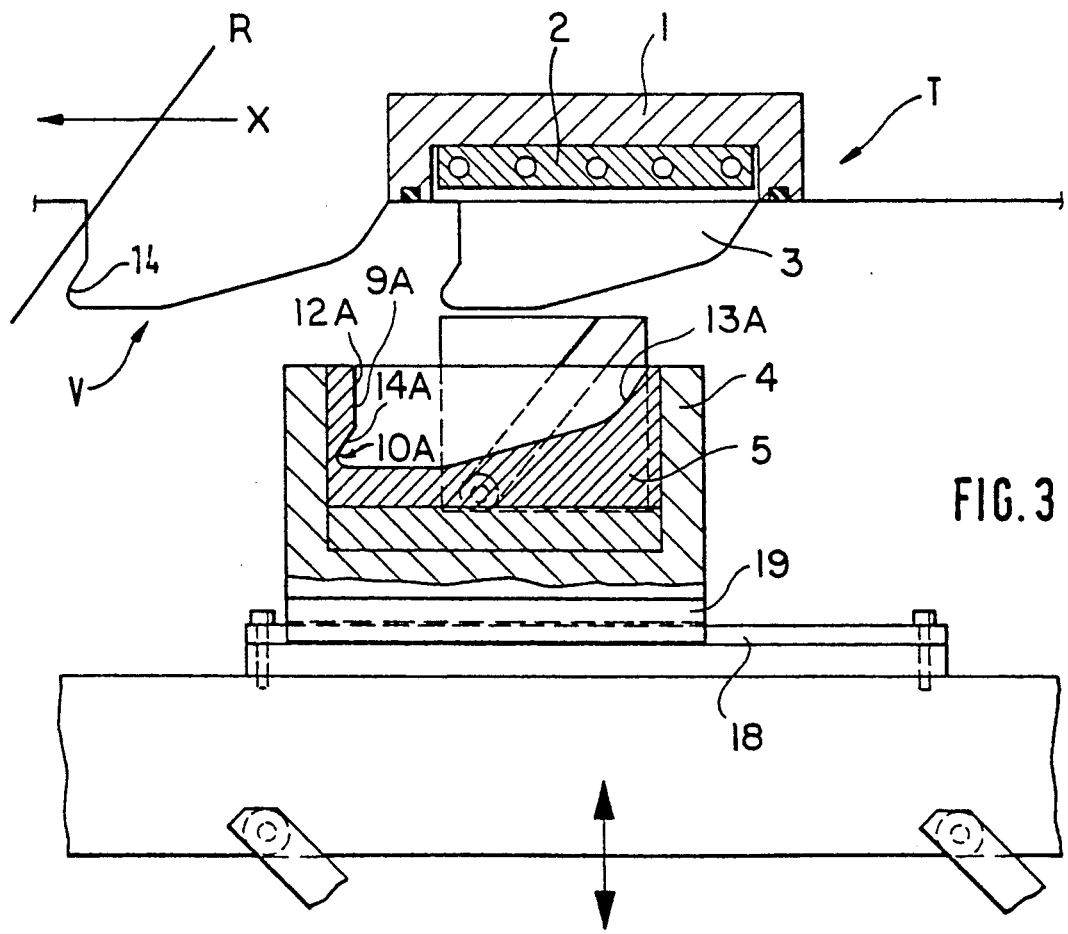
FIG. 3 is similar to FIG. 2, but with the lower part removed.
Figure 4:
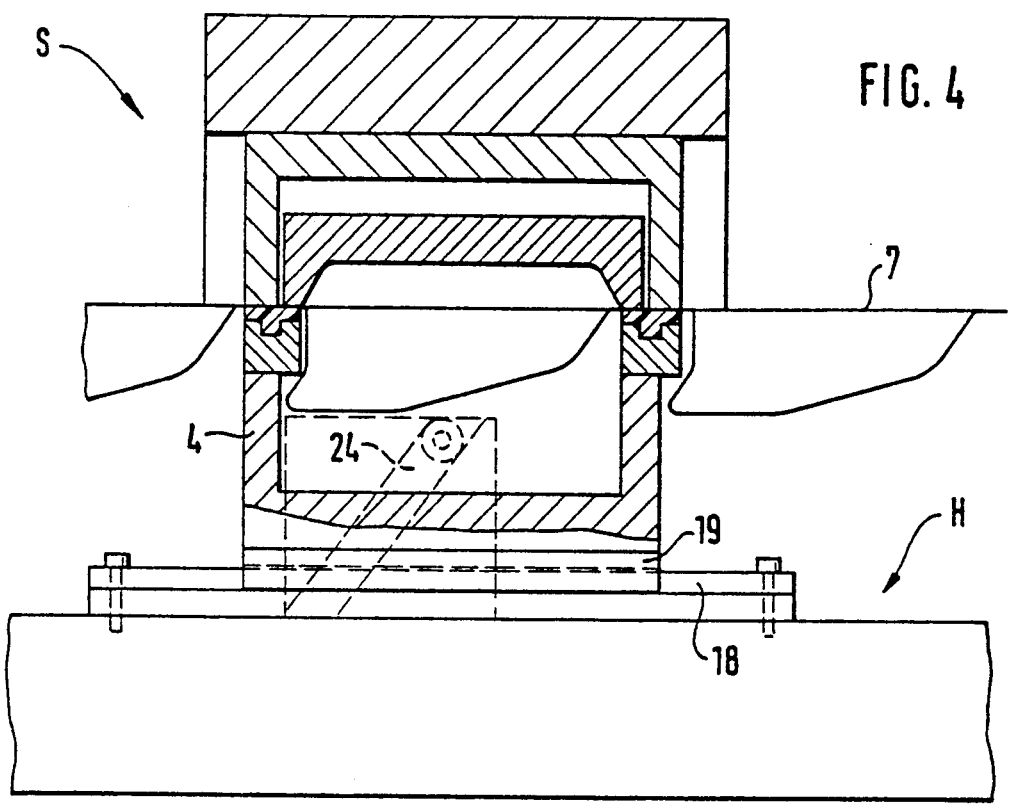
FIG. 4 is a partially cross-sectioned side view of a sealing station S having a closed sealing tool.

The deep-drawing station T of FIGS. 2 and 3 consists first of an upper part 1 containing a heating member 2 and a die 3. An associated lower part 4 contains a matrix 5; the upper die 3 and the matrix 5 form the deep-drawing tool 3; 5. The bottom foil F1 is shaped into a receiving part 6 within the deep-drawing station T. The receiving part 6 is closed by a closing part 7 formed out of the upper foil F2 in a sealing station S (FIG. 4). The two foils F1 for the receiving part 6 and F2 for the closing part 7 have generally different thicknesses. An arrow 8 shows the transporting direction of the packaging line extending along an axis X. A base surface or first sidewall 9, 9A has a protuberance 10 which extends in the conveying direction compared with a plane containing the base surface 9, 9A and thus results in an undercut 10A in the matrix 5 (FIG. 3). The base surface 9, 9A extends along an axis Y perpendicularly with respect to the transporting direction 8 in the exemplary embodiment; however, it is also possible that the surface 9, 9A is slightly tilted (counterclockwise in the drawing) so that the actual base surface 9, 9A formed between the protuberance 10, 10A and an edge 12, 12A parallel to the protuberance extends inclined to the transporting direction 8. An undercut remains also in this case in the deep-drawing tool 3; 5. A cover surface or second sidewall 13, 13A forms a side of the package V which is opposite the base surface. It extends exactly parallel to a transition surface 14, 14A which extends along an axis R and connects the protuberance 10, 10A with the remaining base surface. This transition surface 14, 14A meets the actual base surface 9, 9A at an obtuse angle.

Figure 5:
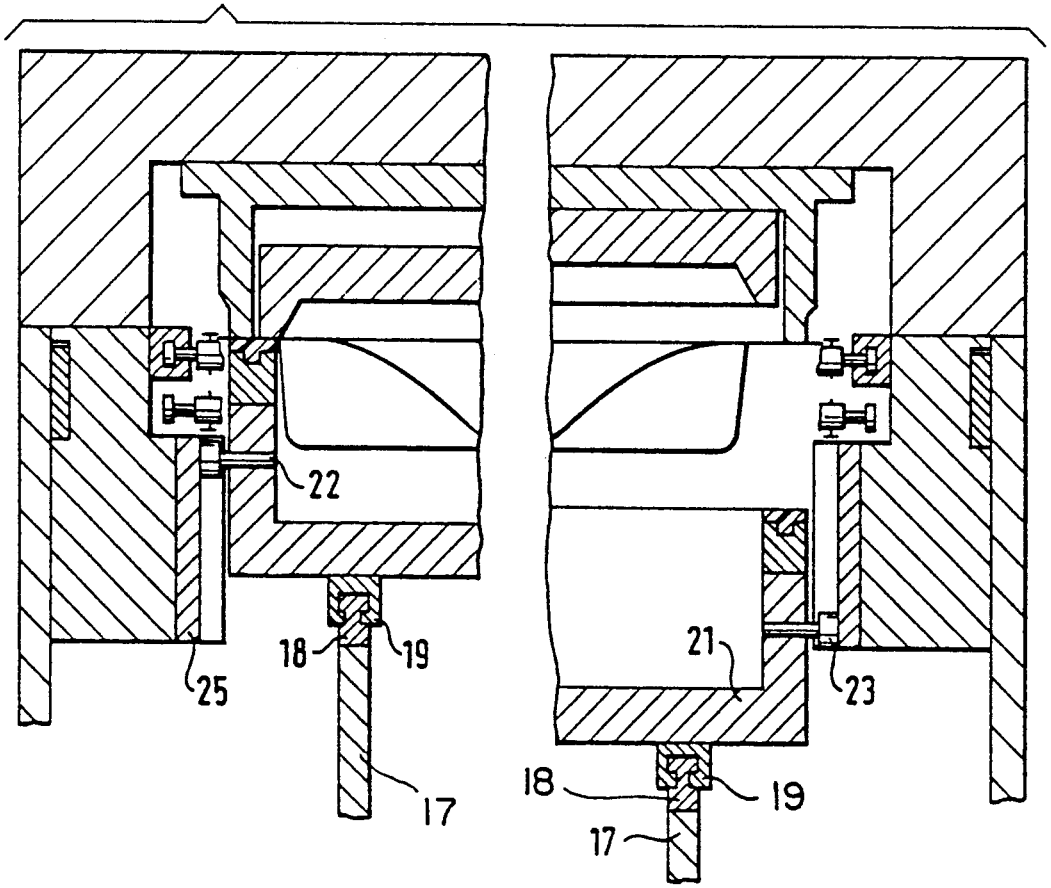
FIG. 5 is a front view of the sealing tool of FIG. 4, all of it in cross section, with the left part being closed and the right part being opened.
Figure 6:
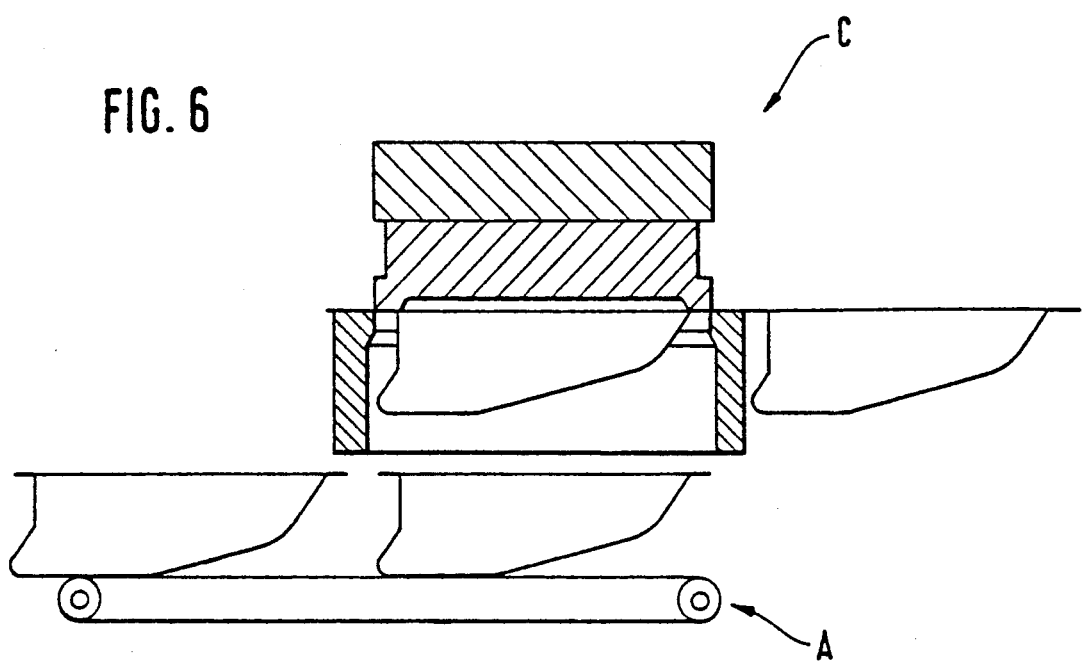
FIG. 6 is a cross-sectional view of a cutting station C, including the associated removal belt A.

The lifting device H assures that the lower part 4 can be moved vertically; this operating direction is identified by an arrow 15. The lifting device H is thereby moved in a simple manner by toggle levers 16. Between the lower part 4 and the lifting device H which, corresponding with FIG. 5, consists of two lifting rails 17, each coupled to a carriage or upper guide means 19 and a carriage guide or lower guide means 18, as this can be recognized particularly easily in FIGS. 4 and 5. The carriage guides 18 are mounted on the respective lifting rails 17. The carriages 19 are slidably engaged with and supported by the respective carriage guides 18, for example, by forming a dovetail guide assembly 20. Carriages 19 are fixedly secured to the lower part 4. It is to be understood that roller bearings can instead be provided so that the mobility of the carriage can be further improved.

A guide pin 22 is rigidly fastened to each of the sidewalls 21 of the lower part 4. The free end 23 of each guide pin, which free end is advantageously a roller bearing, is guided on an inclined guide track 24 provided on a plate 25 which is stationarily fastened to the machine frame. The so formed guide system 23; 24 extends exactly parallel with respect to the transition surface 14 and the cover surface 13.

It is easily recognized that independent of the respective work station the same guide systems 23; 25, slide rails, etc. can be provided.

Figure 7:
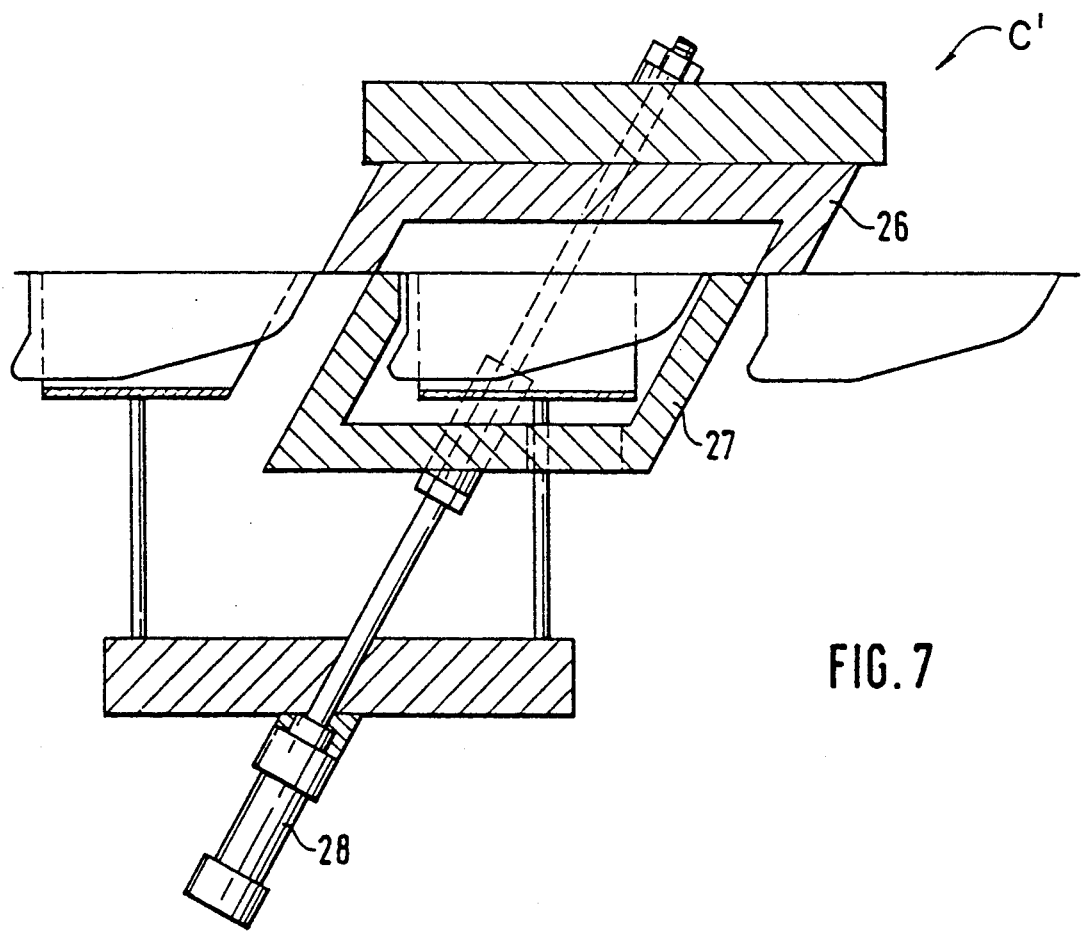
FIG. 7 illustrates a slightly differently designed cutting station C'.
Figure 9:
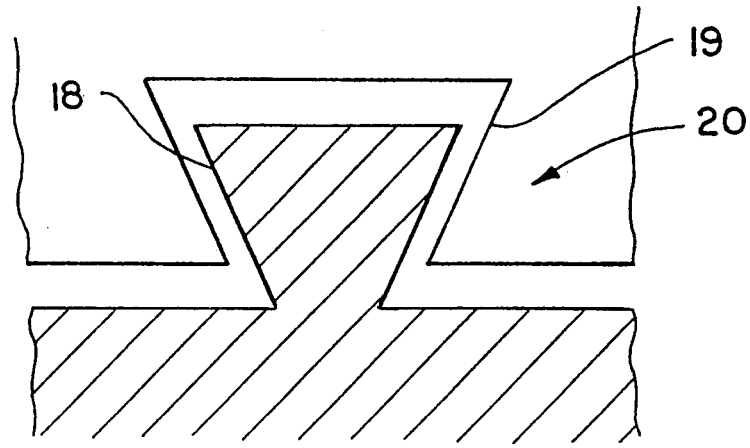
FIG. 9 is a cross-sectional view of a dove-tailed guide assembly.
Figure 8:
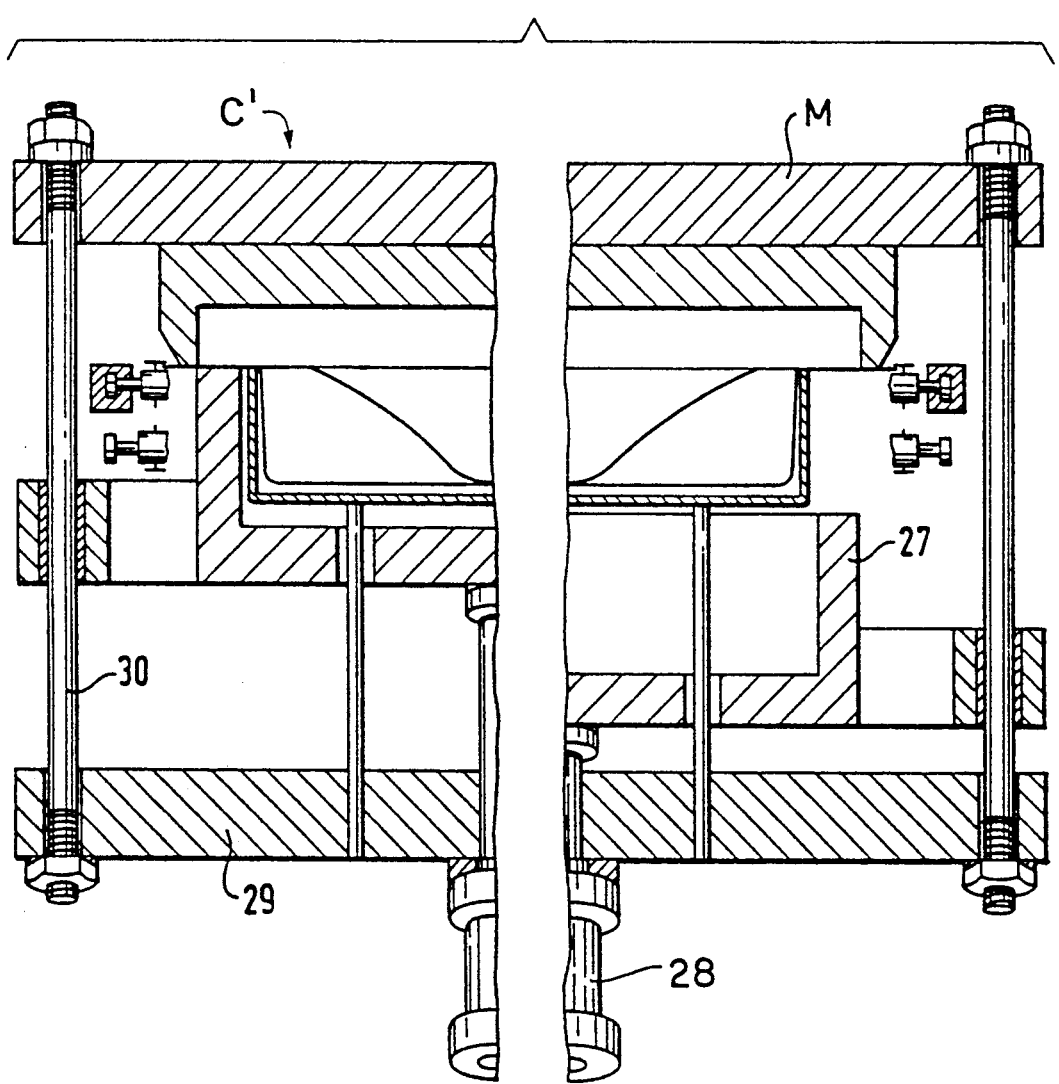
FIG. 8 is a front view of FIG. 7.

A cutting station C' corresponding to FIGS. 7 and 8 shows that the package can be separated from the foils F1 and F2 in one single punch cut. The two cutting dies 26 and 27 are suitably inclined (parallel with respect to the transition surface 14); the cutting die 26 releases in its moved-out position the right side of FIG. 8) the package path. A pneumatic lifting cylinder 28 operates the movable cutting die 26 toward and away from the stationary one 27. The lifting cylinder 28 is held in a supporting structure 29 which in turn is stationarily mounted on the machine frame M by means of anchor bolts 30.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus for manufacturing a package in a deep-drawing station positioned along a packaging line wherein the apparatus receives a web of foil extending in a transporting direction for performing a deep-drawing operation thereon prior to advancing the web of foil in the transporting direction, the apparatus including a frame and a mold secured to the frame, the mold having a stationary upper part with a contoured die projecting downwardly therefrom, a moveable lower part positioned below said upper part which is moveable upwardly during the deep-drawing operation and is moveable downwardly during an opening of the mold, the lower part including an upwardly facing matrix disposed therein and having an opposingly contoured surface for receiving the contoured die, the opposingly contoured surface of the matrix including first and second sidewalls extending transverse to and spaced-apart in the transporting direction, the first sidewall having a transition surface oriented along a first axis extending other than perpendicular to a plane of the web of foil extending in the transporting direciton and forming an undercut region in the matrix, and the second sidewall extending parallel to the transition surface, the apparatus further including a lifting means for facilitating a movement of the lower part in a direction along the first axis during the deep-drawing operation, the improvement wherein the lifting means includes at least one first guide means secured to the lower part and oriented in the transporting direction, and at least on second guide means relatively moveably coupled to and supporting said at least one first guide means, and a lifting device limited to movement substantially along a second axis extending perpendicular to the plane of the web of foil, said at least one second guide means being mounted on said lifting device and moveable therewith.

2. The apparatus according to claim 1, wherein the lower part is horizontally slidably moveable along said at least on second guide means in the transporting direction of the package.

3. The apparatus according to claim 1, wherein the lifting device includes a drive means for moving said at least one second guide means substantially along said second axis.

4. The apparatus according to claim 1, wherein said lifting means further includes a third guide means secured to said lower part, and a fourth guide means relatively moveably coupled to and supporting said third guide means.

5. The apparatus according to claim 4, wherein the first and third guide means are operatively coupled respectively to the second and fourth guide means through means defining dovetail-shaped guide assemblies.

6. The apparatus according to claim 1, wherein roller bearings are arranged between the first and second guide means.

7. The apparatus according to claim 1, wherein a guide bolt is fastened to at lest one sidewall of the lower part, which bolt is guided in an associated stationary guide track mounted on the frame and extending in a direction along the first axis so that as said lifting device moves along the second axis, the lower mold part will be moved therewith but along the first axis, a relative movement between the lower mold part and the lifting device being accommodated by the relative movement between said first and second guide means.

8. In an apparatus for use in at least one of a deep-drawing station and a sealing station positioned along a packaging line wherein the apparatus receives at least one web of foil extending in a transporting direction for performing a manufacturing operation thereon before the web of foil is advanced in the transporting direction, the apparatus including a frame, a stationary upper part secured to the frame, a moveable lower part positioned below the upper part and being moveable to and from the upper part along a firs taxis extending other than perpendicular to a plane of the web of foil, and a lifting means coupled to the lower part for facilitating a movement of the lower part along the first axis, the improvement wherein the lifting means includes:

means for limiting the lifting means to movement substantially along a second axis extending perpendicular to the plane of the web of foil;

means for slidably coupling the lower part to the lifting means to permit movement of the lower part along a third axis extending parallel with the plane of the web of foil; and means for guiding the lower part along the first axis as the lifting means travels substantially along said second axis.

9. The apparatus as claimed in claim 8, wherein said means for slidably coupling includes at least one first carriage guide secured to the lifting means and oriented thereon in the transporting direction, and at least one second carriage guide secured to the lower part and being slidably supported by said at least one first carriage guide.

10. The apparatus as claimed in claim 9, wherein the lifting means also includes tow spaced-apart lifting rails, one of said lifting rails being secured to said first carriage guide, and the other of said lifting rails being secured to a third carriage guide which slidably supports a fourth carriage guide secured to the lower part.

11. The apparatus as claimed in claim 10, wherein the first and second carriage guides, and the third and fourth carriage guides are operatively coupled respectively through means defining dovetail-shaped guide assemblies.

12. The apparatus as claimed in claim 10, wherein a plurality of roller bearing are arranged between the first and second carriage guides and the third and fourth carriage guides respectively.

13. The apparatus as claimed in claim 8, wherein said means for guiding includes at least one guide bolt secured to the lower part, and at least one stationary guide track secured to the frame and extending along the first axis.

14. The apparatus as claimed in claim 8, wherein the lifting means is driven by at least one toggle lever.

* * * * *

UNITED STATES PATENT AND TRADEMARK OFFICE
CERTIFICATE OF CORRECTION

PATENT NO. : 5 307 610
DATED : May 3, 1994
INVENTOR(S) : Hans-Juergen SCHNEIDER, et al It is certified that error appears in the above-indentified patent and that said Letters Patent is hereby corrected as shown below:

On the title page, item [73] and in column 1, the name of assignee; change

"Kraemer & Grebe GmbH & Co. KG Meschinenfabrik," to

---Kraemer & Grebe GmbH & Co. KG Maschinenfabrik,---.

Column 4, line 46; change "direciton" to ---direction---.

line 54; change "at least on" to

---at least one---.

line 63; change "at least on" to

---at least one---.

Column 5, line 16; change "lest" to ---least---.

line 36; change "firs taxis" to ---first axis---.

Column 6, line 19; change "tow" to ---two---.

Signed and Sealed this

Eighteenth Day of October, 1994

Attest:

BRUCE LEHMAN

Attesting Officer

Commissioner of Patents and Trademarks